B. F. PHILLIPS.
STUBBLE-GUARD FOR PLOWS.
No. 190,781. Patented May 15, 1877.
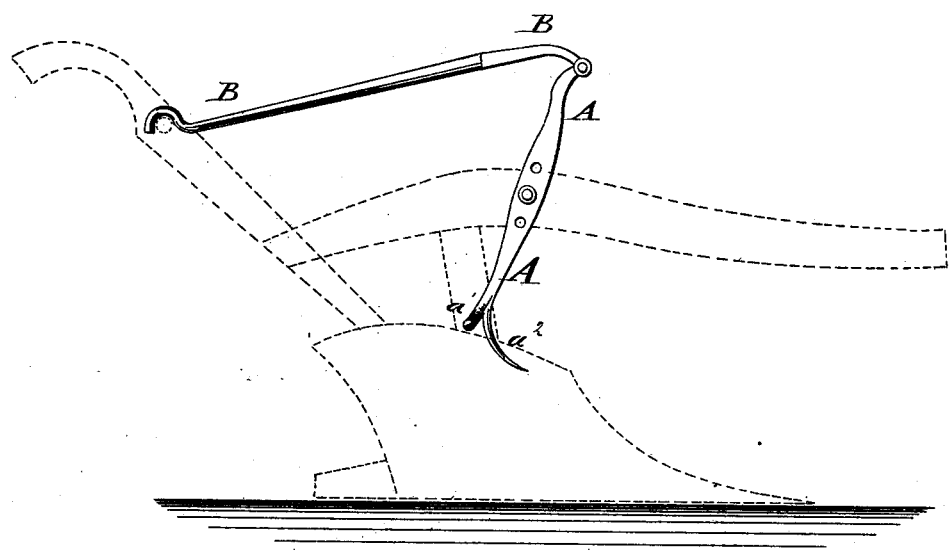
Fig: 1.
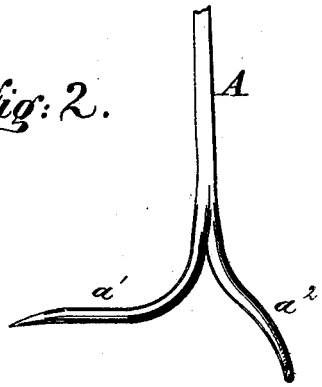
Fig: 2.
WITNESSES:
INVENTOR:
B. F. Phillips
BY
ATTORNEYS.

UNITED STATES PATENT OFFICE.

BENJAMIN F. PHILLIPS, OF LOWDEN, IOWA, ASSIGNOR TO NICODEMUS HENRY, OF SAME PLACE.

IMPROVEMENT IN STUBBLE-GUARDS FOR PLOWS.

Specification forming part of Letters Patent No. 190,781, dated May 15, 1877; application filed April 2, 1877.

*To all whom it may concern:*

Be it known that I, BENJAMIN FRANKLIN PHILLIPS, of Lowden, in the county of Cedar and State of Iowa, have invented a new and useful Improvement in Stubble-Guard for Plows, of which the following is a specification:

Figure 1 is a side view of my improved device, illustrating its use. Fig. 2 is a front view of the lower or forked part of the same.

Similar letters of reference indicate corresponding parts.

The object of this invention is to furnish an improved device for clearing a plow of stubble, weeds, and other trash, which shall be simple in construction and convenient and effective in use, enabling the plow to be cleared by the plowman while standing erect in his place, and without stopping the team.

The invention will first be described in connection with the drawing, and then pointed out in the claim.

A is a bar, which is designed to be pivoted to the plow-beam by a screw or bolt. Several holes are formed in the bar A to receive the pivoting-bolt, to enable the device to be applied to plows of different heights. Upon the lower end of the bar A are formed two branches, prongs, or arms, $a^1$ $a^2$, the prong $a^1$ resting upon the top of the mold-board, and the other, $a^2$, extending down its side. To the upper end of the bar A is pivoted the forward end of a rod, B, the rear end of which has a hook formed upon it to hook upon the round of the plow-handle, or upon some other support attached to said handle, so that it may always be in convenient reach of the plowman.

With this device the plowman, by operating the bar A with the rod B, can readily clear his plow of rubbish without stopping his team.

I am aware that it is not new to clean plow-irons by means of a scraper pivoted to plow-beam and operated by the plowman; but

What I claim is—

A plow-cleaner constructed with arms $a^1$ $a^2$, shaped, arranged with respect to each other, and applicable as shown and described.

BENJAMIN FRANKLIN PHILLIPS.

Witnesses:
   J. S. PARR,
   E. JOHNSON.